United States Patent
Kobayashi et al.

(10) Patent No.: US 6,552,291 B1
(45) Date of Patent: Apr. 22, 2003

(54) WIRE ELECTRIC DISCHARGE MACHINE

(75) Inventors: Hiroatsu Kobayashi, Tokyo (JP); Seiji Satou, Tokyo (JP); Takuji Magara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/049,424

(22) PCT Filed: Aug. 20, 1999

(86) PCT No.: PCT/JP99/04462

§ 371 (c)(1), (2), (4) Date: Feb. 12, 2002

(87) PCT Pub. No.: WO01/14092

PCT Pub. Date: Mar. 1, 2001

(51) Int. Cl.$^7$ .................................................. B23H 7/10
(52) U.S. Cl. ............................. 219/69.12; 219/69.12; 219/69.14
(58) Field of Search ........................... 219/69.12, 69.14

(56) References Cited

U.S. PATENT DOCUMENTS

| 4,481,095 A | * | 11/1984 | Inoue | 219/69.12 |
| 4,704,511 A | * | 11/1987 | Miyano | 219/69.12 |
| 4,803,327 A | * | 2/1989 | Obara | 219/69.12 |
| 5,315,088 A | * | 5/1994 | Yamada et al. | 219/69.12 |

FOREIGN PATENT DOCUMENTS

| JP | 60-67028 A |   | 4/1985 |           |
| JP | 61-19516 A | * | 1/1986 | 219/69.12 |
| JP | 61-109615 A | * | 5/1986 |           |

OTHER PUBLICATIONS

Concise statement of relevancy for JPA–60–67028, No publication date.

* cited by examiner

Primary Examiner—Geoffrey S. Evans
(74) Attorney, Agent, or Firm—Sughrue Mion, PLLC (57) ABSTRACT

A wire electrical discharge machining apparatus provided with: a nozzle for spraying and supplying machining liquid, the nozzle being supported so that a state of the nozzle is switched over from a contact state with a work piece to a non-contact state with the work piece, and vice versa; a spring acting on the nozzle in a direction to make the nozzle move away from the work piece; a pump for changing and controlling a hydraulic pressure of the machining liquid; and electrical conduction switch-over apparatus by which power supply to the work piece is switched over from the nozzle of a conductor to apparatus other than the nozzle, and vice versa, such that the hydraulic pressure of the machining liquid during electric discharge machining is changed and controlled by the pump so that the state of the nozzle is switched over from the contact state to the non-contact state.

4 Claims, 8 Drawing Sheets

WIRE ELECTRIC DISCHARGE MACHINE

BACKGROUND OF THE INVENTION

1. Technical Field

The present invention relates to a wire electric discharge machining apparatus in which machining electric power is supplied between a wire electrode and a work piece so as to machine the work piece by discharge energy, and particularly to an improvement of such a wire electric discharge machining apparatus.

2. Background Art

Figure 8:
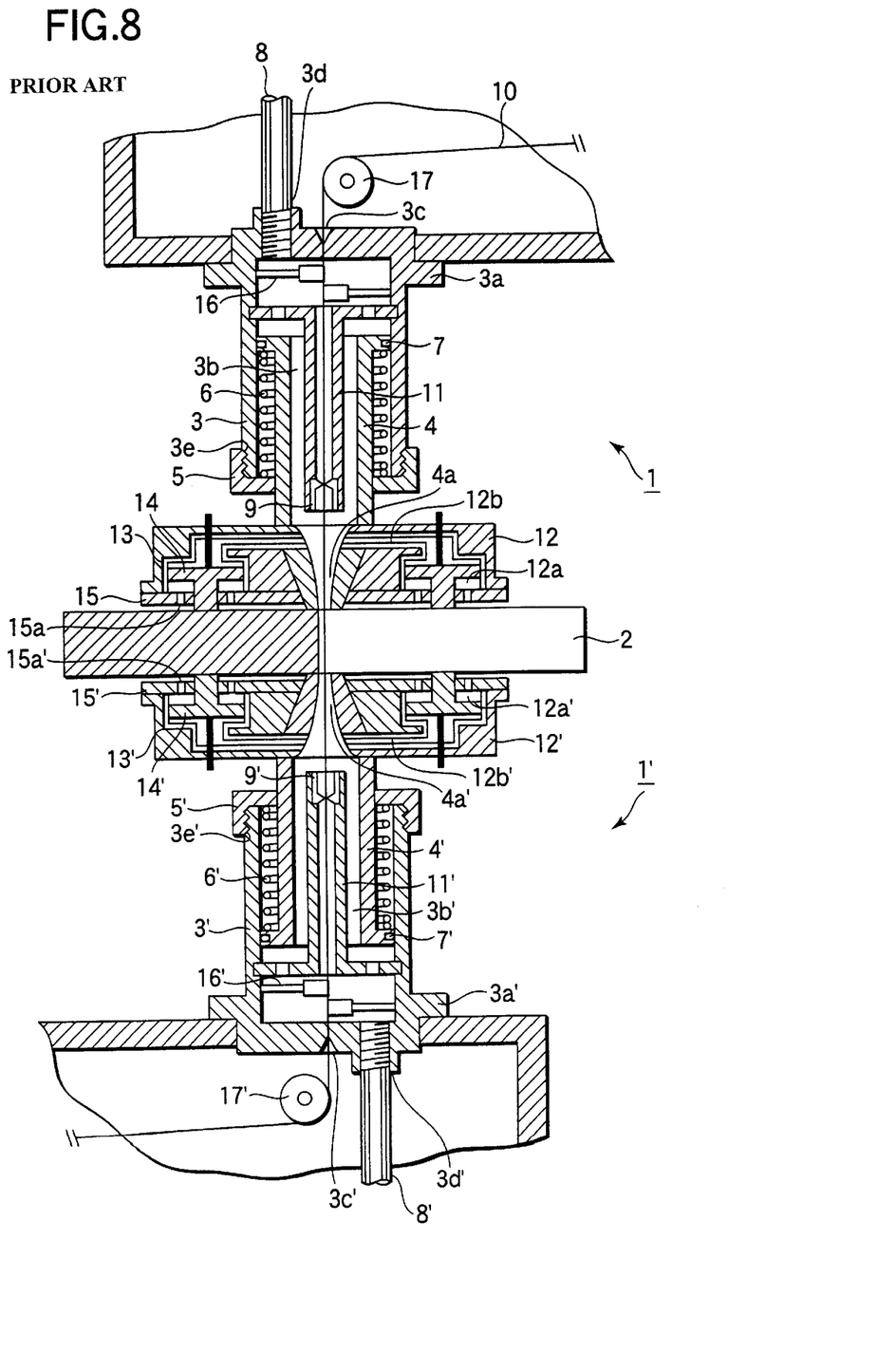
FIG. 8 is a sectional view of a portion of a conventional wire electric discharge machining apparatus, showing a part thereof in which machining is carried out.

FIG. 8 is a sectional view of a portion of a wire electric discharge machining apparatus disclosed in JP-B-4-25091, showing a part thereof in which machining is carried out. In FIG. 8, a pair of, that is, upper and lower, electrically conductive nozzle units 1 and 1' are disposed to face each other symmetrically with respect to a work piece 2 which is fixed to a surface plate (not shown) by a retainer (not shown). Because the upper, and lower electrically conductive nozzle units 1 and 1' are identical with each other in configuration and function, constituent elements of the lower electrically conductive nozzle unit 1' will be referenced correspondingly to those of the upper electrically conductive nozzle unit 1 but with their reference numbers put with dashes (primes). Description will be therefore made below only as to the upper electrically conductive nozzle unit 1. In FIG. 8, the upper electrically conductive nozzle unit 1 is constituted by a nozzle holder 3, a nozzle 4, a box nut 5, a spring 6, an O-ring 7, a machining liquid supply conduit 8, a wire electrode 10, a guide die 9 for guiding the wire electrode 10, a die holder 11, a conductive element mounting bracket 12 attached to the forward end of the nozzle 4, an insulation member 13, a conductive element 14, a plate 15, a conductive pin 16, and a guide roller 17. The conductive element mounting bracket 12 is constituted by a conductive element housing 12a shaped like a ring or divided into a plurality of segments in the conductive element mounting bracket 12, and a conduit 12b formed in the conductive element mounting bracket 12 to supply machining liquid to the conductive element housing 12a. The insulation member 13 covers the inside of the conductive element housing 12a. The whole of the conductive element 14 is shaped like a ring or divided into a plurality of segments each having a predetermined angle. The plate 15 receives the conductive element 14 which is slidable in the conductive element mounting bracket 12, and allows the forward end portion of the conductive element 14 to be exposed from the plate 15. The plate 15 has liquid draining holes 15a. The conductive pin 16 supplies electric power to the wire electrode 10. The guide roller 17 guides the wire electrode 10.

The nozzle holder 3 is constituted by a mounting flange 3a, a nozzle chamber 3b, a bore 3c for inserting the wire electrode 10, a hole 3d to which a machining liquid supply conduit 8 is attached, and a thread portion 3e. The die holder 11 is fixed to the nozzle holder 3, and further, the spring 6 and the box nut 5 are attached thereto in the order. On the other hand, although the nozzle 4 is slidable upward and downward in the nozzle chamber 3b, the nozzle 4 is halted at a movable end separated from the work piece 2 by a restoring force of the compressed spring 6 when the nozzle 4 is not in a machining state.

Further, the nozzle 4 has a small hole 4a, as a machining liquid discharging port, at one end of the nozzle 4. The wire electrode 10 fed from a feeder (not shown) is pulled into the inside of the electrically conductive nozzle unit 1 through the wire electrode inserting bore 3c of the nozzle holder 3, and pulled out from the small hole 4a of the nozzle 4 via the conductive pin 16 and the guide die 9. Then, the wire electrode 10 passes through the inside of the lower electrically conductive nozzle unit 1', and finally, is recovered by a recovery apparatus (not shown).

The conductive element 14 is received slidably in the conductive element housing 12a, and designed to always come into contact with the surface of the work piece 2 during machining by the function of the hydraulic pressure of the machining liquid. Further, an output terminal of a machining power supply (not shown) is connected to an electrically conductive member which is integrally formed with the conductive element 14 extruding from the conductive element mounting bracket 12 toward a side opposite to the plate 15. Further, for example, a capacitive discharge circuit with a small stray inductance is formed in such a manner that one terminal of a machining gap capacitor (not shown) is connected to the above-mentioned electrically conductive member while the other terminal of the machining gap capacitor is connected to a power supply terminal to the conductive pin 16.

The wire electric discharge machining apparatus configured thus can obtain larger discharge current amplitude so as to improve the machining speed.

However, in the conventional wire electric discharge machining apparatus described above, the conductive element 14 for supplying electric power to the work piece 2 is received slidably in the conductive element housing 12a, and always pressed against the surface of the work piece 2 during machining by the function of the hydraulic pressure of the machining liquid. Accordingly, particularly in finishing machining, there is a problem that the machining accuracy such as surface roughness and dimensional accuracy or the like is lowered.

Further, in the case where the electric power is supplied to the work piece 2 not from the conductive element 14 but from the surface plate (not shown) or the like supporting the work piece 2, there is another problem that the machining speed is decreased.

DISCLOSURE OF THE INVENTION

The present invention was achieved in order to solve the above problems. Therefore, an object of the present invention is to provide a wire electric discharge machining apparatus which is high in productivity and which can prevent the machining accuracy such as surface roughness and dimensional accuracy or the like from being lowered.

According to an aspect of the present invention, there is provided a wire electric discharge machining apparatus in which machining liquid is interposed between a wire electrode and a work piece and the work piece is machined by discharge energy, the wire electric discharge machining apparatus being constituted by: electrically conductive means supported so that a state of the electrically conductive means is switched over between a contact state where the electrically conductive means comes into contact with the work piece and a non-contact state where the electrically conductive means does not come into contact with the work piece; drag generating means for generating drag acting on the electrically conductive means in a direction to make the electrically conductive means move away from the work piece; machining liquid pressure controlling means for changing and controlling a hydraulic pressure of the machining liquid; and electrical conduction switch-over means for switching over power supply to the work piece between a direction from the electrically conductive means to means other than the electrically conductive means and another direction from the means other than the electrically conductive means to the electrically conductive means, wherein the hydraulic pressure of the machining liquid during electric discharge machining is changed and controlled by the machining liquid pressure controlling means so that the state of the electrically conductive means is switched over between the contact state where the electrically conductive means comes into contact with the work piece and the non-contact state where the electrically conductive means does not come into contact with the work piece in accordance with a desired machining speed and desired machining accuracy to thereby carry out machining.

Further, according to another aspect of the present invention, there is provided a wire electric discharge machining apparatus in which machining liquid is interposed between a wire electrode and a work piece and the work piece is machined by discharge energy, the wire electric discharge machining apparatus comprising: electrically conductive means supported so that a state of the electrically conductive means is switched over between a contact state where the electrically conductive means comes into contact with the work piece and a non-contact state where the electrically conductive means does not come into contact with the work piece; drag generating means for generating drag acting on the electrically conductive means in a direction to make the electrically conductive means move away from the work piece; and electrical conduction switch-over means for switching over power supply to the work piece between a direction from the electrically conductive means to means other than the electrically conductive means and another direction from the means other than the electrically conductive means to the electrically conductive means, wherein a force generated by the drag generating means is changed and controlled so that the state of the electrically conductive means is switched over between the contact state where the electrically conductive means comes into contact with the work piece and the non-contact state where the electrically conductive means does not come into contact with the work piece in accordance with a desired machining speed and desired machining accuracy to thereby carry out machining.

Further, preferably, the electrically conductive means is a nozzle for spraying and supplying the machining liquid.

Since the present invention is configured as described above, there is an effect that both machining speed and machining accuracy can be improved.

BEST MODE FOR CARRYING OUT THE INVENTION

First Embodiment

Figure 1:
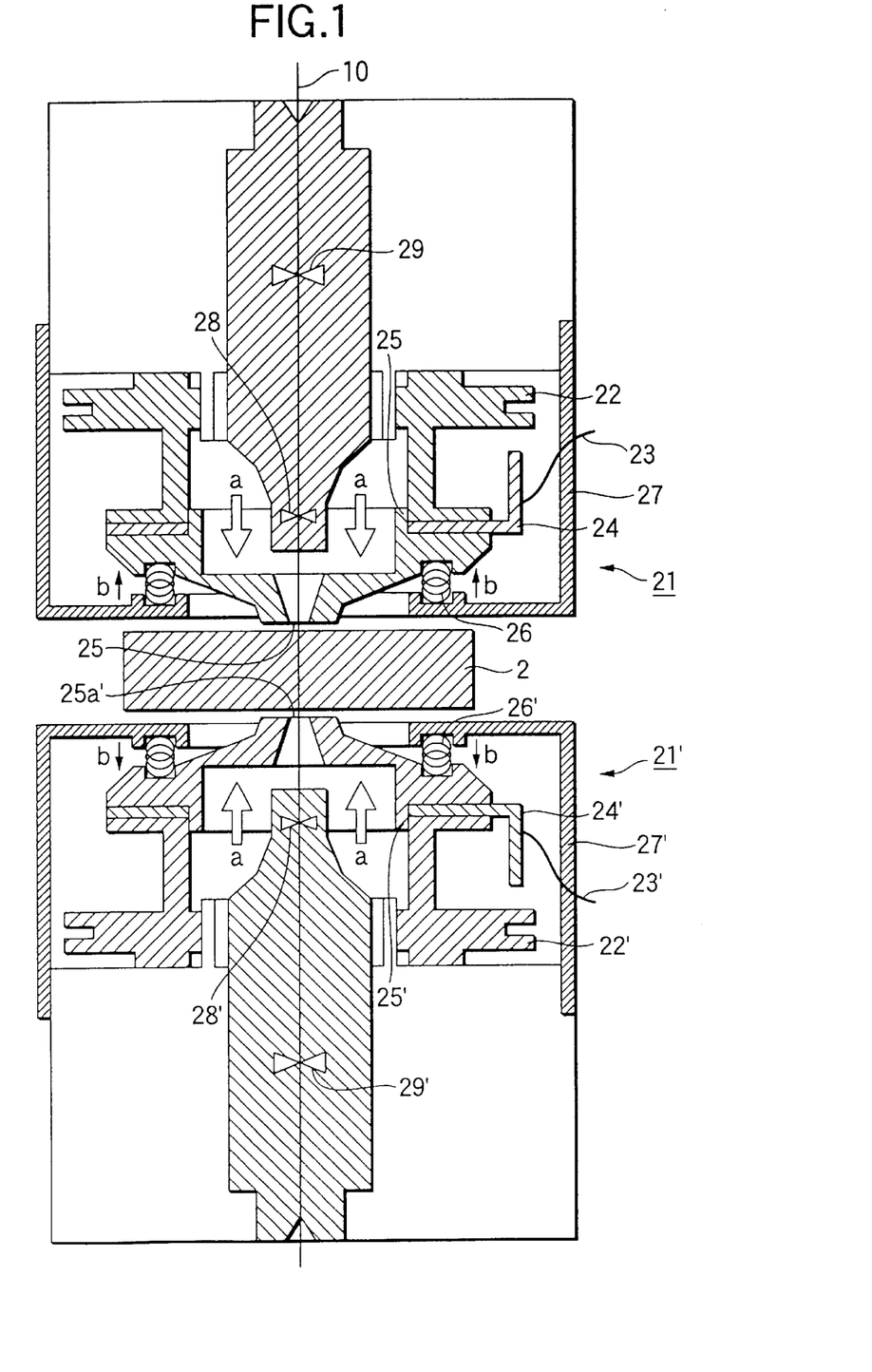
FIG. 1 is a sectional view of a portion of a wire electric discharge machining apparatus according to the first embodiment of the present invention, showing a part thereof in which machining is carried out.

FIG. 1 is a sectional view of a portion of a wire electric discharge machining apparatus according to the first embodiment of the present invention, showing a part thereof in which machining is carried out. In FIG. 1, a pair of, that is, upper and lower electrically conductive nozzle units 21 and 21' are disposed to face each other symmetrically with respect to a work piece 2 which is fixed to a surface plate (not shown) by a retainer (not shown) Because the upper and lower electrically conductive nozzle units 21 and 21' are identical with each other in configuration and function, the constituent elements of the lower electrically conductive nozzle unit 21' are referenced correspondingly to those of the upper electrically conductive nozzle unit 21 but with their reference numerals put with dashes (primes). Hereinafter, description will be made mainly as to the upper electrically conductive nozzle unit 21. In FIG. 1, the upper electrically conductive nozzle unit 21 is constituted by a wire electrode 10 supplied from a feeder (not shown), an insulation member 22 for preventing a short circuit between the wire electrode 10 and the work piece 2 from occurring, a lead wire 23 connected to an output terminal of a machining power supply (not shown), a lead wire mounting plate 24 made of an electric conductor, a nozzle 25 as conductive means attached to the insulation member 22, a spring 26, a spring mounting plate 27, a guide die 28 for guiding the wire electrode 10, and a conductive element 29 for supplying electric power to the wire electrode 10.

The nozzle 25 is made of a conductive material which has a small coefficient of friction so as to prevent the surface of the work piece 2 from being damaged as much as possible. The nozzle 25 has a small hole 25a as a spray port of the machining liquid. The diameter of the small hole 25a is selected so as to form a gap that is at least larger than the machining gap between the wire electrode 10 and the small hole 25a. The wire electrode 10 is pulled out from the small hole 25a of the nozzle 25, passes through the lower electrically conductive nozzle unit 21' and is recovered by a recovery apparatus (not shown).

As described above, the wire electric discharge machining apparatus feeds the wire electrode 10 to the work piece 2. The wire electric discharge machining apparatus supplies machining electric power between the wire electrode 10 and the work piece 2 from a not-shown machining power supply, and at the same time, supplies the machining liquid between the electrodes (the wire electrode 10 and the work piece 2) to thereby machine the work piece 2 by discharge energy.

Hereinafter, the force that acts on the nozzle 25, which is electrically conductive means, in a direction toward the work piece 2 (in the direction a) will be referred to as "thrust", whereas the force that acts on the nozzle 25 in a direction to make the nozzle 25 move away from the work piece 2 (in the direction b) will be referred to as "drag".

The insulation member 22 is made of an insulative material or a non-insulative material coated with an insulative material, and has a predetermined hardness and stiffness. Accordingly, when a hydraulic pressure of the machining liquid is put on the insulation member 22, the insulation member 22 expands. On the other hand, when the hydraulic pressure of the machining liquid is decreased, the insulation member 22 contracts from its expanded state. When the machining liquid is supplied to the inside of the electrically conductive nozzle unit 21, the "thrust" is generated by the hydraulic pressure of the machining liquid. At the same time, the "drag" is generated by the elastic deformation of the insulation member 22. Furthermore, since the spring 26 has a predetermined spring constant and has a restoring force in a direction to restrain the nozzle 25 (in the direction b) from moving toward the work piece 2, the spring 26 also generates "drag". In this case, the means for generating drag that acts on the nozzle 25 in the direction to make the nozzle 25 move away from the work piece 2 are the insulation member 22 and the spring 26.

Figure 2:
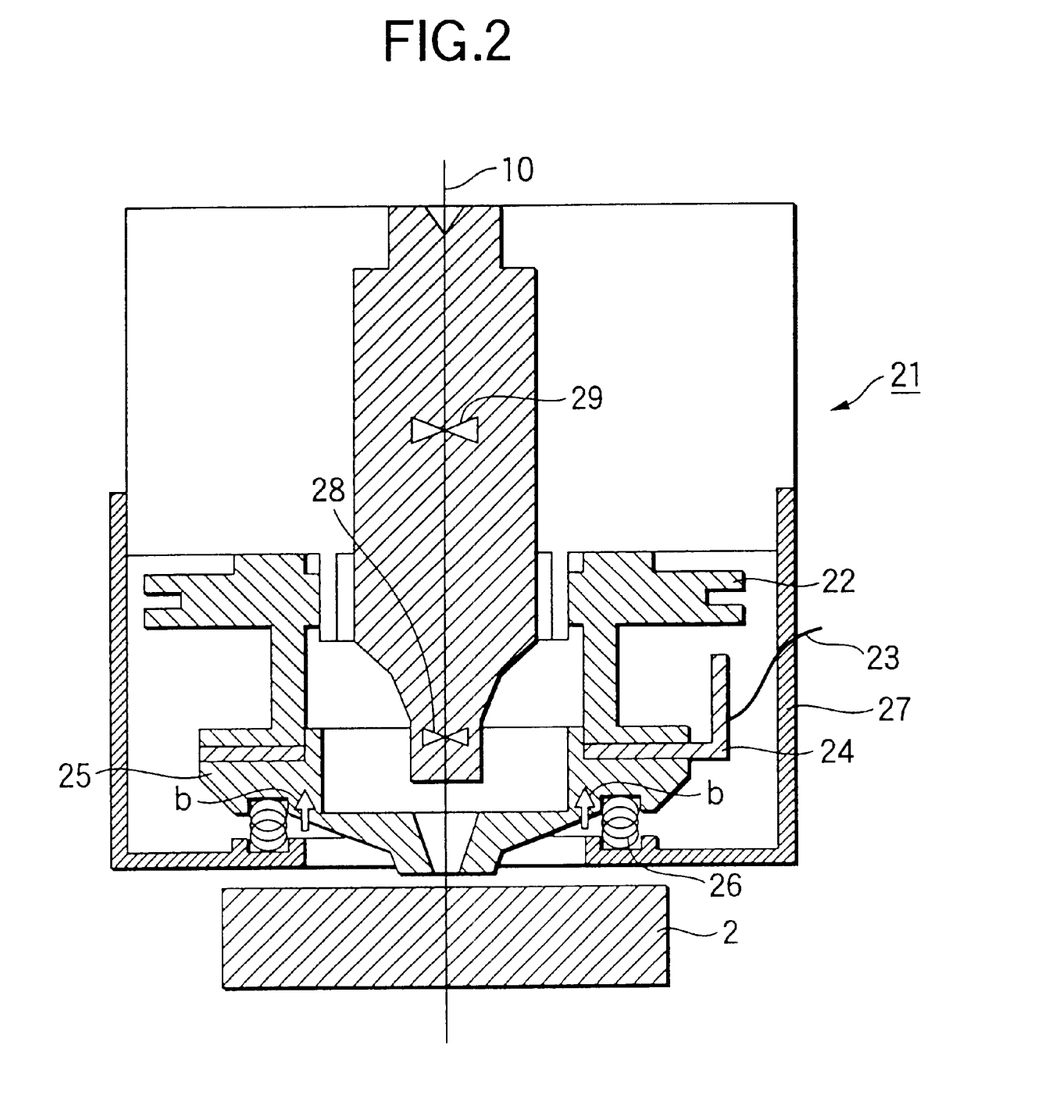
FIG. 2 is a sectional view of the motion of an electrically conductive nozzle unit in the wire electric discharge machining apparatus according to the first embodiment of the present invention when machining is not carried out.

Accordingly, as shown in FIG. 2, in non-machining state, the nozzle 25 is halted at a movable end separated from the work piece 2 by the "drag" generated by the restoring force of the spring 26.

Next, comparison of function effects is made between a case where the electric power is supplied to the work piece 2 from the nozzle 25 (case A) and a case where the electric power is supplied to the work piece 2 from the surface plate (not shown) that supports the work piece 2 (case B).

Figure 3:
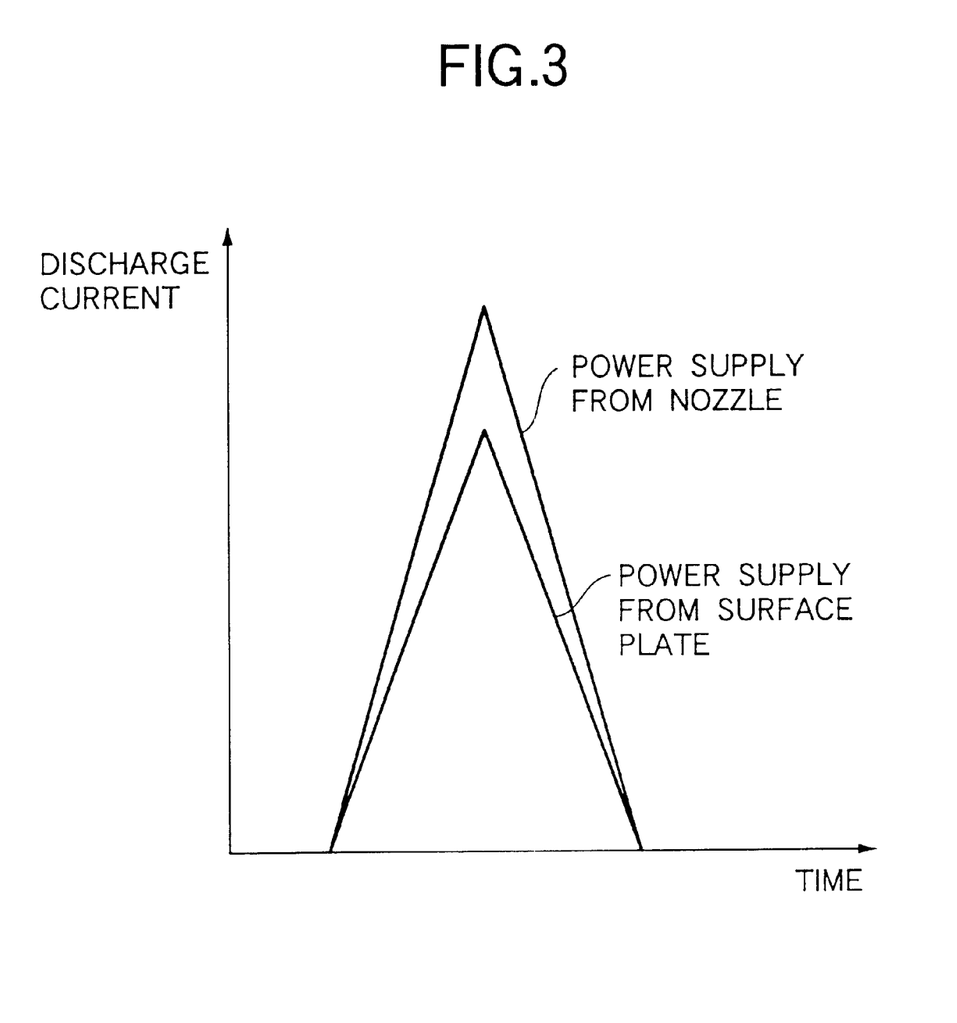
FIG. 3 is a diagram showing waveforms of discharge currents.

The lead wire for supplying electric power to the wire electrode 10 and the lead wire for supplying electric power to the work piece 2 from the machining power supply (not shown) are laid up to the vicinity of the conductive element 29 through a coaxial cable, and are separated from each other in the vicinity of the conductive element 29. Accordingly, in the case B, taking into consideration the relative movement between the electrically conductive nozzle unit 21 and the work piece 2, because it is necessary to provide the lead wire 23 with an extra length, the lead wire 23 in the case A may be shorter in length than that in the case B. Further, because the path from the nozzle 25 to the machining gap in the case A is shorter than the path from the above-mentioned surface plate to the machining gap in the case B, the stray inductance of the electric discharge machining circuit in the case A can be reduced. Accordingly, for example, as shown in FIG. 3, the case A (in which electric power is supplied from the nozzle 25) can obtain the steeper waveform of the discharge current than that of the case B (in which electric power is supplied from the surface plate). Accordingly, if the pulse width in the case A is identical with that in the case B, a higher discharge current amplitude can be obtained so that the machining speed can be improved. However, because the nozzle 25 comes into contact with the work piece 2, the case A is suitable for rough machining rather than finishing machining.

On the other hand, in the case B (in which electric power is supplied from the surface plate), because the nozzle 25 does not come into contact with the work piece 2, the machining accuracy such as dimensional accuracy or the like can be prevented from being lowered. Accordingly, the case B is suitable particularly for finishing machining.

Figure 4:
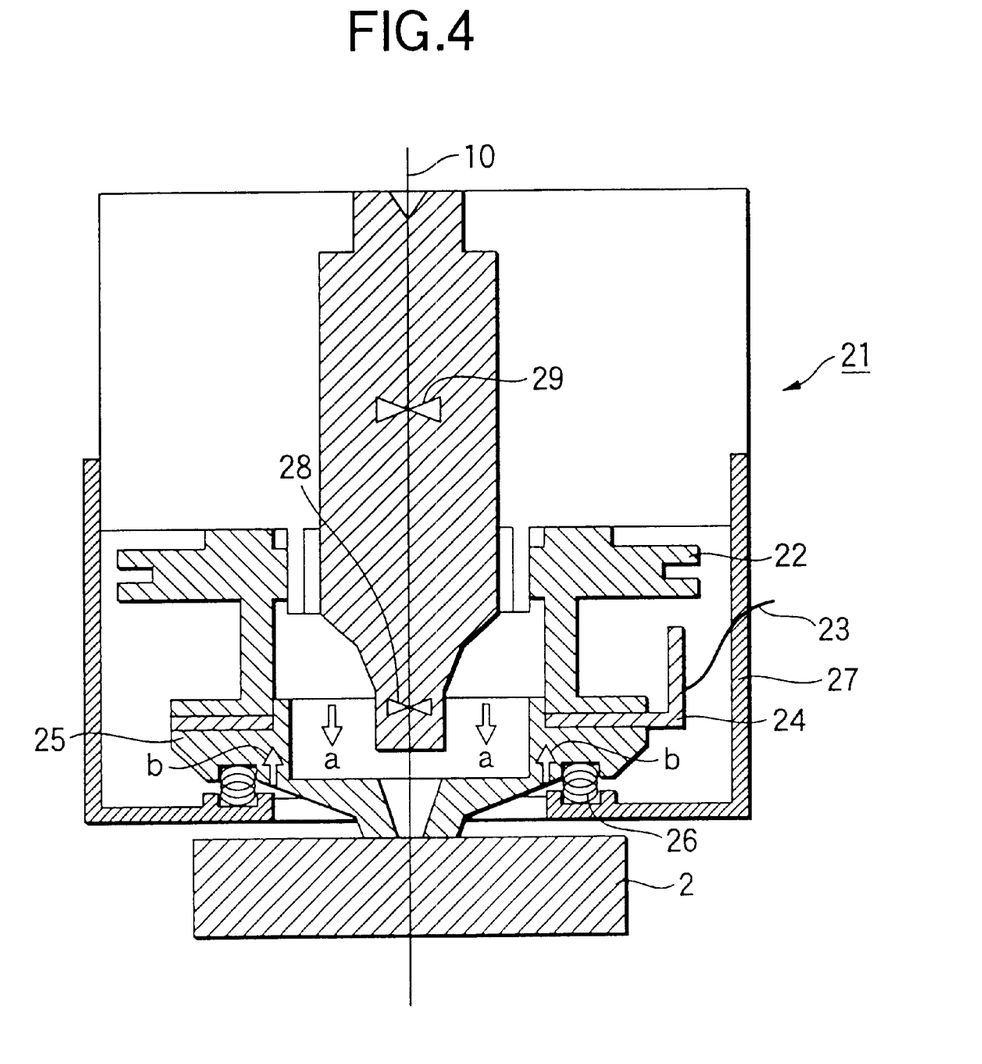
FIG. 4 is a sectional view showing a motion of the electrically conductive nozzle unit in the wire electric discharge machining apparatus according to the first embodiment of the present invention during machining in a case where the hydraulic pressure of machining liquid is higher than a predetermined value.

In the case where the hydraulic pressure of the machining liquid is larger than a predetermined value, as shown in FIG. 4, the "thrust" (in the direction a) is larger than the "drag" (in the direction b), the forward end of the nozzle 25 comes into contact with the work piece 2. In this case, because the electric power from the machining power supply (not shown) passes through the lead wire 23 and the lead wire mounting plate 24, and is supplied from the forward end of the conductive nozzle 25, which is also the electrically conductive means, to the work piece 2, the machining speed can be improved as described above. Accordingly, electric power supply from the nozzle 25 is suitable for rough machining.

Furthermore, in the case where the forward end of the nozzle 25 comes into contact with the surface of the work piece 2, the small hole 25a of the nozzle 25 is connected to the machining gap per se. Accordingly, the machining liquid sprayed from the small hole 25a directly flows through the machining gap and cools the wire electrode 10. At the same time, the machining scrap can be washed away and the cause of abnormal discharge can be eliminated so that the electrical discharge machining can be carried out reliably.

Figure 5:
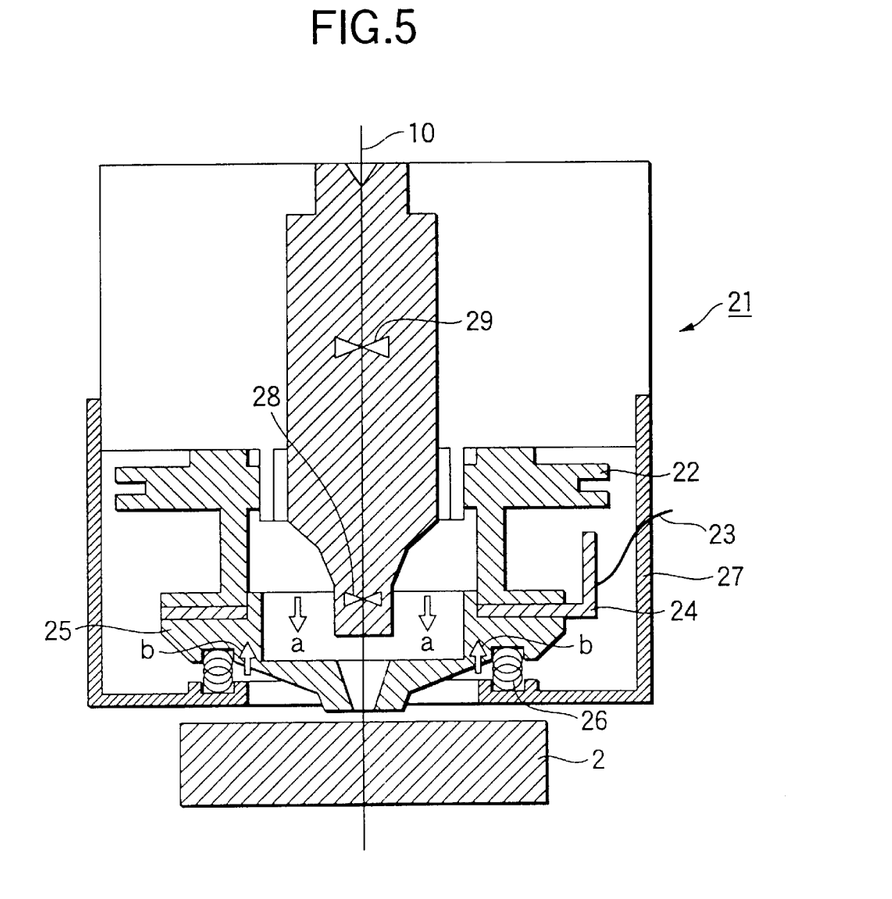
FIG. 5 is a sectional view showing a motion of the electrically conductive nozzle unit in the wire electric discharge machining apparatus according to the first embodiment of the present invention during machining in a case where the hydraulic pressure of machining liquid is lower than the predetermined value.

In the case where the hydraulic pressure of the machining liquid is smaller than a predetermined value, as shown in FIG. 5, the "thrust" (in the direction a) is smaller than the "drag" (in the direction b), the nozzle 25 does not come into contact with the work piece 2 and the predetermined gap is maintained. In this case, the electric power can be supplied to the work piece 2, for example, from the surface plate. In this case, because the nozzle 25 does not come into contact with the work piece 2, the machining accuracy such as dimensional accuracy or the like can be prevented from being lowered as described above. Accordingly, electric power supply from the surface plate is suitable particularly for finishing machining.

The electrically conductive means for supplying electric power to the work piece 2 as described above can be switched over, for example, by a semiconductor relay or conductor or the like.

Also, both the power supply from the nozzle 25 and the power supply from the surface plate may be used in combination for rough machining.

Figure 6:
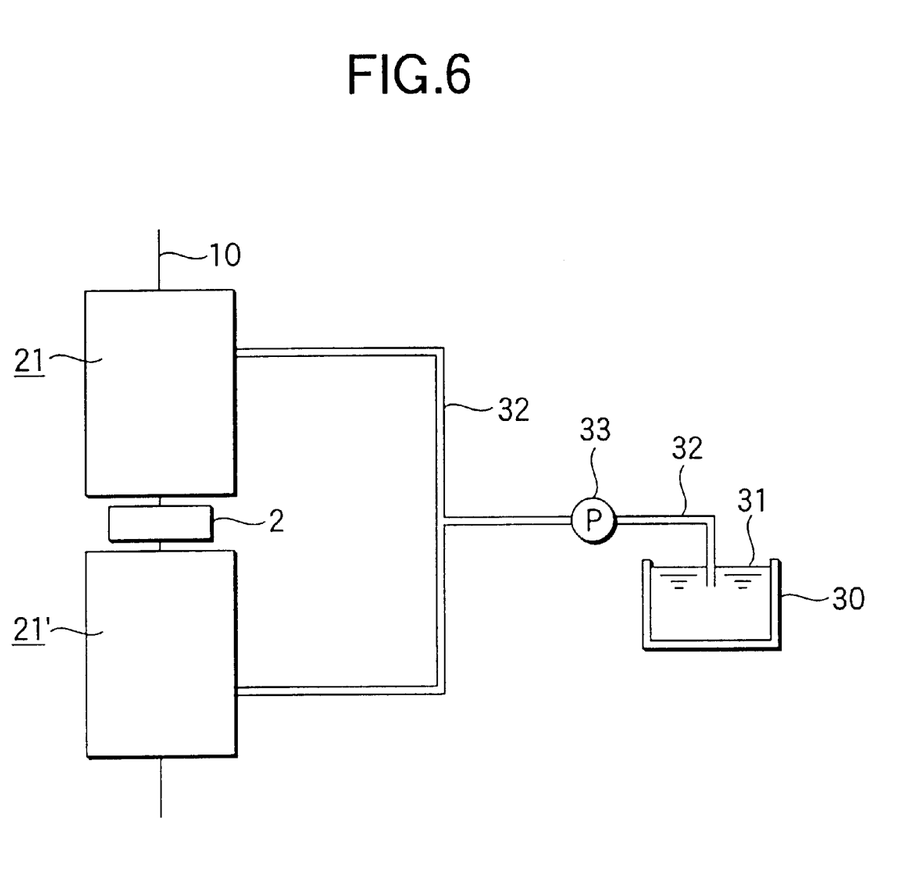
FIG. 6 is a diagram showing an example of a configuration for controlling the hydraulic pressure of the machining liquid in the wire electric discharge machining apparatus according to the first embodiment of the present invention.

Next, description will be made as to the method for controlling the hydraulic pressure of the machining liquid. FIG. 6 is a diagram showing an example of a configuration for controlling the hydraulic pressure of the machining liquid. In FIG. 6, reference numeral 30 designates a machining liquid tank, 31 designates machining liquid, 32 designates a conduit and 33 designates a pump. The pump 33 is an example of means for controlling the hydraulic pressure of the machining liquid. The pump 33 such as a variable displacement pump can variably control the flow rate of the pump. With the configuration described above, not only the supply flow rate of the machining liquid to the electrically conductive nozzle units 21 and 21' but also the hydraulic pressure of the machining liquid can be changed and controlled. Accordingly, the "thrust" can be changed and controlled. That is, the state of the nozzle 25 or 25' with respect to the work piece 2 can be switched over between the contact state and the non-contact state.

In the example shown in FIG. 6, description is made about the case in which the conduit 32 from the pump 33 is made to branch off and the machining liquid is supplied to the electrically conductive nozzle units 21 and 21' respectively through the branched conduit parts. However, the pump 33 may be provided for each of the electrically conductive nozzle units 21 and 21'.

As described above, given the "drag" generated by the drag generating means, the "thrust" can be changed and controlled when the hydraulic pressure of the machining liquid during electric discharge machining is changed and controlled by the machining liquid pressure controlling means, so that the state of the nozzle 25 with respect to the work piece 2 can be switched over between the contact state and the non-contact state in accordance with a desired machining speed and desired machining accuracy to and the power supply to the work piece 2 is switched over. Accordingly, both the machining speed and the machining accuracy can be improved.

Figure 7:
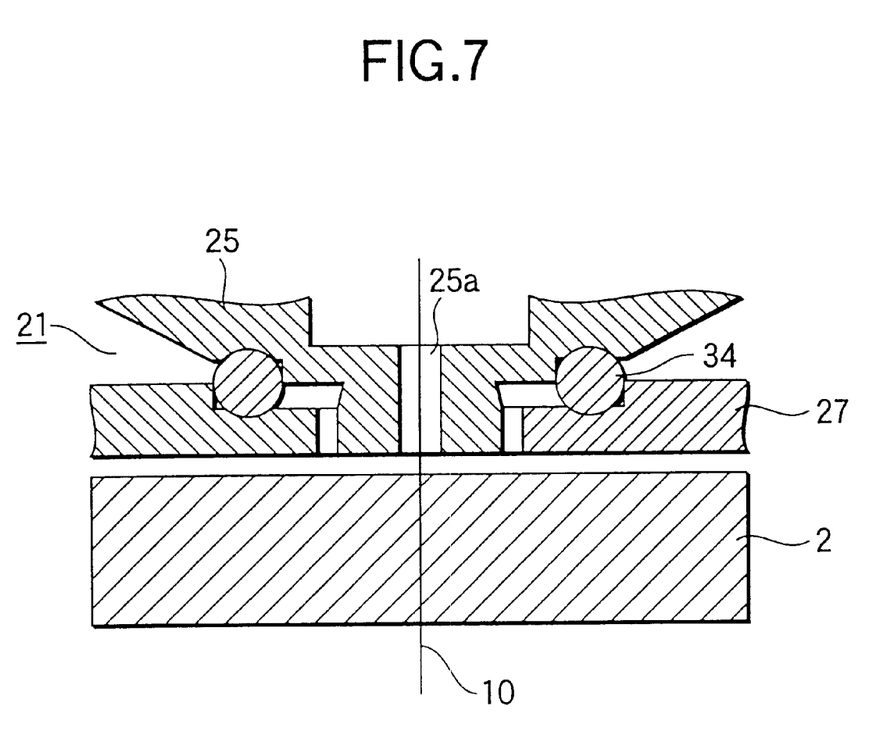
FIG. 7 is a sectional view showing an example of drag generating means in the wire electric discharge machining apparatus according to the first embodiment of the present invention.

Further, although the above description has been made about the case where the spring 26 is used as the drag generating means to provide the "drag" to the nozzle 25, another elastic body may be used in place of the spring 26. FIG. 7 shows an example of such a configuration in which, for example, the "drag" is given by the restoring force of an O-ring 34.

Incidentally, although the above description is made about the case in which the insulation member 22 has a predetermined hardness and stiffness, and expands and contracts in accordance with the hydraulic pressure of the machining liquid, the insulation member 22 may be supported elastically by another elastic member, or may be supported movably in the above-mentioned directions a and b by a linear guide. That is, it is sufficient if the nozzle 25 is supported so as to come into contact with the work piece 2 and separate therefrom. In the case where the insulation member 22 is supported movably in the above-mentioned directions a and b by a liner guide, the drag generating means is the spring 26 only.

Still further, although the above description is made about the case in which both the upper and lower electrically conductive nozzle units are of the configuration according to the present invention, an electrically conductive nozzle unit as described in the related art may be adopted in place of any one of the upper and lower electrically conductive nozzle units.

Second Embodiment

The first embodiment has described the case in which, given the "drag" generated by the drag generating means, the state of the nozzle 25 with respect to the work piece 2 is switched over between the contact state and the non-contact state when the hydraulic pressure of the machining liquid during electric discharge machining is changed and controlled by the machining liquid pressure controlling means to thereby change and control the "thrust". However, the state of the nozzle 25 with respect to the work piece 2 may be switched over between the contact state and the non-contact state when the "drag" is changed and controlled while the hydraulic pressure of the machining liquid is maintained at a predetermined pressure level to thereby maintain the "thrust" at a specific level by the hydraulic pressure of the machining liquid. As for a method for changing and controlling such "drag", a method using electromagnetic force, a method using fluid force, or the like, may be used. In addition to the method shown in FIG. 6, an example of the method using fluid force is a so-called artificial rubber muscle using method in which expansion and contraction of a rubber tube made of fiber-reinforced rubber is controlled by air pressure. For example, in the method using the artificial rubber muscle, a rubber tube made of fiber reinforced rubber is disposed in place of the O-ring 34 shown in FIG. 7 and the air pressure in the rubber tube is changed, so that the "drag" is changed. With such a configuration described above, the state of the nozzle 25 or 25' with respect to the work piece 2 can be switched over between the contact state and the non-contact state without changing and controlling the hydraulic pressure of the machining liquid, and the same effect as the first embodiment is obtained.

The first or second embodiment has described the case in which the state of the nozzle 25 with respect to the work piece 2 is switched over between the contact state and the non-contact state when the "thrust" or the "drag" is changed and controlled. However, electrically conductive means separately from the conductive nozzle 25 may be connected to the nozzle so that the state of the electrically conductive means with respect to the work piece 2 is switched over between the contact state and the non-contact state.

Further, the above description has been made about the case in which the wire electrode 10 is fed in the vertical direction and the electrically conductive nozzle units 21 and 21' are positioned above and below the work piece 2 respectively. However, the feeding direction of the wire electrode 10 and the positional relationship among the electrically conductive nozzle units 21 and 21' and the work piece 2 are not limited to the description of the above-described embodiments.

Industrial Applicability

As described above, the wire electric discharge machining apparatus according to the present invention is high in productivity and can prevent the machining accuracy such as surface roughness and dimensional accuracy or the like from being lowered. Accordingly, the wire electric discharge machining apparatus according to the present invention is suitable for use in wire electric discharge machining.

What is claimed is:

1. A wire electric discharge machining apparatus in which machining liquid is interposed between a wire electrode and a work piece and said work piece is machined by discharge energy, said wire electric discharge machining apparatus comprising:

electrically conductive means supported so that a state of said electrically conductive means is switched over between a contact state where said electrically conductive means comes into contact with said work piece and a non-contact state where said electrically conductive means does not come into contact with said work piece;

drag generating means for generating drag acting on said electrically conductive means in a direction to make said electrically conductive means move away from said work piece;

machining liquid pressure controlling means for changing and controlling a hydraulic pressure of said machining liquid; and electrical conduction switch-over means for switching over power supply to said work piece from said electrically conductive means and/or from the means other than said electrically conductive means, wherein said hydraulic pressure of said machining liquid during electric discharge machining is changed and controlled by said machining liquid pressure controlling means so that the state of said electrically conductive means is switched over between the contact state where said electrically conductive means comes into contact with said work piece and the non-contact state where said electrically conductive means does not come into contact with said work piece in accordance with a desired machining speed and desired machining accuracy to thereby carry out machining.

2. A wire electric discharge machining apparatus according to claim 1, in which said electrically conductive means is a nozzle for spraying and supplying said machining liquid.

3. A wire electric discharge machining apparatus in which machining liquid is interposed between a wire electrode and a work piece and said work piece is machined by discharge energy, said wire electric discharge machining apparatus comprising:

electrically conductive means supported so that a state of said electrically conductive means is switched over between a contact state where said electrically conductive means comes into contact with said work piece and a non-contact state where said electrically conductive means does not come into contact with said work piece;

drag generating means for generating drag acting on said electrically conductive means in a direction to make said electrically conductive means move away from said work piece; and electrical conduction switch-over means for switching over power supply to said work piece from said electrically conductive means and/or from the means other than said electrically conductive means, wherein a force generated by said drag generating means is changed and controlled so that the state of said electrically conductive means is switched over between the contact state where said electrically conductive means comes into contact with said work piece and the non-contact state where said electrically conductive means does not come into contact with said work piece in accordance with a desired machining speed and desired machining accuracy to thereby carry out machining.

4. A wire electric discharge machining apparatus according to claim 3, in which said electrically conductive means is a nozzle for spraying and supplying said machining liquid.

* * * * *